June 23, 1970 R. C. SEAMANS, JR 3,517,221
DEPUTY ADMINISTRATOR OF THE NATIONAL AERONAUTICS AND SPACE ADMINISTRATION
FLIPFLOP INTERROGATOR AND BI-POLAR CURRENT DRIVER
Filed July 29, 1966
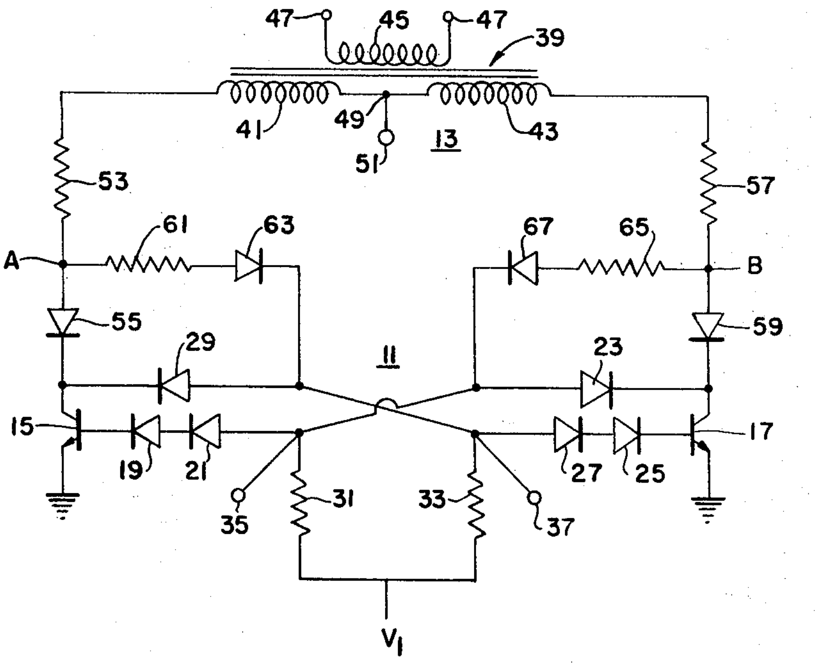
INVENTORS
C. F. Chong &
C. A. Nelson
BY [signature] [signature]
ATTORNEYS United States Patent Office 3,517,221

Patented June 23, 1970

3,517,221

FLIPFLOP INTERROGATOR AND BI-POLAR CURRENT DRIVER

Robert C. Seamans, Jr., Deputy Administrator of the National Aeronautics and Space Administration, with respect to an invention of Carlos F. Chong and Charles A. Nelson, both of Philadelphia, Pa.

Filed July 29, 1966, Ser. No. 568,987
Int. Cl. H03k *3/12*
U.S. Cl. 307—289 2 Claims

ABSTRACT OF THE DISCLOSURE

An interrogator and current driver circuit for combination with a transistor flipflop circuit, wherein the flipflop operates nominally in a saturated state at very low levels of collector current but wherein, during interrogation, the load resistance of the conducting transistor is reduced and wherein the conducting transistor is provided with additional base drive to sustain higher saturation currents so that the conducting transistor of the flipflop operates as the current driver amplifier.

The invention described herein was made in the performance of work under a NASA contract and is subject to the provisions of Section 305 of the National Aeronautics and Space Act of 1958, Public Law 85–568 (72 Stat 435; 42 USC 2457).

This invention relates to current driver circuits and more particularly to bi-polar current driver circuits.

Current drivers are electronic circuits that generate a current pulse for driving electronic circuits or devices. The driver is normally under the control of a control circuit and may generate its current pulses in accordance with the overall timing of a system, for example. Or, the driver may generate a high level pulse in accordance with a low level input pulse.

The output pulses from the driver may be utilized to control the input of information into a register. Or, the driver may be used to control the input of information into the cores of a matrix memory system. Further, the output signal from the driver can be used to control logic circuits. Hence, a current driver circuit has many uses in electronic systems and networks.

A bi-polar current driver is one that provides a bi-polar output in accordance with an input signal. That is, a bi-polar current driver can be controlled to generate either positive or negative pulses. A logic circuit may be used to control the polarity of the output from the bi-polar driver. The timing of the output may then be controlled by a control pulse from an independent source. This system will then generate a pulse of a particular polarity at a particular time.

The bi-polar current driver has many uses in electronic circuits. It may be used to provide a current pulse to the cores of a memory matrix. It may be used to provide a bidirectional current flow to operate logic systems. Or, it may be used to turn on and turn off various switching circuits as desired. For example, a positive output pulse may turn on a particular circuit and a negative pulse may turn off the circuit.

The prior art devices for performing a bipolar current driver function have required separate circuits to generate bi-polar pulses. That is, one circuit to generate negative pulses and another circuit to generate positive pulses. These circuits have required the use of a large number of electronic components connected in complex circuit arrangements. A coupling network has been used to connect the positive and negative drivers to a common output. In addition, prior art control devices for current drivers have generally required relatively high currents to operate. This disadvantage has resulted in power lòss as well as a requirement for electronic components that operate at these current levels.

Hence, the primary disadvantages of the prior art reside in complex circuits and components, and in the high level current inputs necessary to operate the control circuits for the bi-polar current drivers.

Therefore, it is an obect of this invention to provide a new and improved bi-polar current driver circuit.

It is a further object of this invention to provide a new and improved bi-polar driver circuit wherein the logic circuit controlling the current driver operates at a much lower current level than does the current driver.

In accordance with a principle of the invention the outputs from a low input current bistable flip-flop are connected to a transformer coupling circuit. The transformer coupling circuit is also connected to a current pulse source. When a current pulse is applied to the transformer coupling network an output is produced. The polarity of the output is dependent upon the state of the bistable flip-flop.

It will be appreciated that the foregoing is a simple device requiring the use of a conventional flip-flop circuit in conjunction with a transformer coupling network. In addition, the mere application of an input pulse generates a bipolar output. Moreover, the polarity of the output is dependent upon the state of the flip-flop. Hence, the device is simple and uncomplicated and provides a bi-polar current for driving electronic circuitry.

The foregoing objects and many of the attendant advantages of this invention will become more readily appreciated as the same becomes better understood by reference to the following detailed description when taken in conjunction with the accompanying drawings wherein:

The figure is a schematic diagram of a current driver constructed in accordance with the invention.

Turning now to the drawing wherein like reference numbers designate like parts throughout the several views. The circuit illustrated comprises a bistable flip-flop generally indicated at 11 and a driver circuit generally indicated at 13. The bistable flip-flop comprises a first NPN transistor 15 and a second NPN transistor 17. The emitter of each of the transistors is grounded. The base of the first transistor 15 is connected to the cathode of a first diode 19; and the anode of the first diode is connected to the cathode of a second diode 21. The anode of the second diode 21 is connected to the anode of a third diode 23; and the cathode of the third diode 23 is connected to the collector of the second transistor 17. Similarly, a fourth diode 25 has its cathode connected to the base of the second transistor 17. The anode of the fourth diode is connected to the cathode of a fifth diode 27. The cathode of the fifth diode is connected to the cathode of a sixth diode 29; and the anode of the sixth diode is connected to the collector of the first transistor 15.

The junction between the second and third diodes is connected through a first resistor 31 to a voltage source $V_1$. Similarly, the junction between the fifth diode 27 and the sixth diode 29 is connected through a second resistor 33 to the voltage source $V_1$. Further, the junction between the second diode and the first resistor is connected to an input terminal 35; and, the junction between the fifth diode and the second resistor is connected to a second input terminal 37.

The foregoing has described a transistorized bistable flip-flop wherein a signal applied to one input 35 sets the bistable flip-flop in one state; while a signal applied to the second input 37 flips the flip-flop to its other state. A bistable flip-flop of this type will operate at a current level as low as 60 microamperes.

The current driver circuit generally illustrated at 13 comprises a transformer 39 having a first primary winding 41 and a second primary winding 43. The transformer 39 has a single secondary winding 45 connected to a pair of terminals 47. One end of each of the two primary windings are connected together at a junction 49; this junction is also connected to a pulse input terminal 51; terminal 51 provides the means for receiving interrogation timing signals to initiate an interrogation interval.

The other end of the first primary winding 41 is connected to one end of a third resistor 53 whose other end is connected to the anode of a seventh diode 55 at a junction A. The cathode of the seventh diode is connected to the collector of the first transistor 15. Similarly, the other end of the second primary winding 43 is connected to one end of a fourth resistor 57; the other end of the fourth resistor is connected to the anode of an eighth diode 59 at a junction B. The cathode of the eighth diode is connected to the collector of the second transistor 16. The junction A between the third resistor and the seventh diode is connected to one end of a fifth resistor 61. The other end of the fifth resistor is connected to the anode of a ninth diode 63. The cathode of the ninth diode is connected to the junction between the fifth and sixth diodes. Similarly, the junction B between the fourth resistor and the eighth diode is connected to one end of a sixth resistor 65; and the other end of the sixth resistor is connected to the anode of a tenth diode 67. The cathode of the tenth diode is connected to the junction between the second and third diodes.

It is to be understood that the first and second primary windings 41 and 43 are wound in the same direction with respect to the secondary winding 45. Hence, when a pulse is applied to the pulse input terminal 51 and passes through the first primary winding 41 it will create a current flow in one direction in the secondary winding. And, when the pulse flows through the second primary winding 43 it will create a current flow in the opposite direction in the secondary winding. Further, when the pulse flows through both primary windings it will create a current flow in the secondary winding in accordance with which primary winding has the greatest current flowing through it.

When the pulse input terminal 51 is at ground, the seventh 55, eighth 59, ninth 63, and tenth 67 diodes are back biased; therefore, the bistable flip-flop 11 operates at its normal low current level. That is, the back bias prevents current from the bias source $V_1$ to flow in the driver circuit 13 and hence, allows the bistable flip-flop to operate as though the driver circuit does not exist.

When an input pulse is applied to the pulse input terminal 51 it flows through both of the primary windings and through the circuitry connected thereto. However, due to the fact that the first and second transistors are connected to the outside ends of the windings and because one is on and the other is off, more current flows through one winding than the other. This current flow is coupled to the secondary winding 45 and determines the direction of current flow through that winding. Specifically, when an input pulse is applied to the pulse input terminal 51 and the first transistor is turned on, the voltage at junction A only rises to a low value while the voltage at junction B rises to a much higher relative value. The connection of the windings 41 and 43 to transistors 15 and 17 through diodes 55 and 59 respectively provide a means for sensing which transistor is conducting. This configuration enables diode 55 and 59 to act as voltage sensitive switches for connecting additional impedance elements in parallel with the collector load of their respective conducting transistor. Specifically, the load impedance of transistor 15, after switching, includes resistor 53, winding 41 and the impedance of the pulse source connected to 51 in parallel with the nominal load impedance, i.e., diode 29, resistor 33 and source impedance of $V_1$. By placing these additional impedance elements in parallel with the collector, the effective load resistance on the collector of transistor 15 is reduced. The design value of these additional resistances switched in by diode 55 is selected so that the effective load resistance results in a load line which enables a collector current of sufficient magnitude to drive other electronic elements, i.e., a collector current of 30 milliamperes as compared with the nominal 60 microamperes.

In order to retain the transistor 15 in a saturated condition at the higher collector current level, as it can be seen from a standard saturated mode graph, is necessary to provide an increased base drive. This drive is provided by the high voltage at junction B which is provided by the pulse at terminal 51. That is, the voltage at junction B provides additional bias to the base of the first transistor 15 and the current path through that transistor remains high because it has a low resistance value due to its remaining saturated. Moreover, the second transistor remains non-conductive because the voltage at junction A is insufficient to turn it on.

In a similar manner if the second transistor is turned on and the first transistor is turned off a large current will flow through the second primary winding 43 and a small current will flow through the first primary winding 41. This small current flow will increase the bias on the base of the second transistor and keep it in saturation. This will allow an increased current to flow through the second secondary winding.

In this manner whether the first or second transistors are turned on determines which primary winding will receive the majority of the current flow. This current will then determine the direction of the pulse output at the output terminals 47. Hence, by controlling the state of the flip-flop the system provides a controlled bi-polar high current output.

The output is controlled by a low current control network. Specifically, a current in the microampere range will control the transistors 15 and 17. However, the current output pulse can be in the milliampere range. More specifically, in one operable embodiment of the invention a bistable flip-flop that operates on 60 microamperes has been used to control a 30 milliampere output pulse.

What is claimed is:

1. In a flipflop interrogation and driver circuit in combination with a low current level transistor flipflop for generating a high level bi-polar driving current representative of said flipflop state, each transistor of said flipflop having collector load impedance and base drive selected to maintain the conducting transistor of said flipflop at very small values of collector current during non-interrogation intervals, the improvement comprising:

terminal means for receiving interrogation timing control signals to initiate an interrogation interval;

sensing means for ascertaining the conducting transistor of said flipflop, said sensing means being coupled to said interrogation timing terminal means for ascertaining the state of said flipflop during said interrogation interval;

switching means, said switching means being responsive to said sensing means for connecting additional impedance elements in parallel with said collector load of said conducting transistor, said additional impedance elements including a primary winding of a transformer, said switching means being coupled to said interrogation timing terminal means;

biasing means, said biasing means being coupled to said interrogation timing terminal means for providing additional base drive to said conducting transistor exclusively during said interrogation interval thereby enabling said conducting transistor to operate in a higher level saturation condition, whereby said conducting transistor will cause said high level bi-polar current to flow in said primary of said transformer in a selected direction, said selected direction of current flow through said primary of said transformer being indicative of the state of said flipflop.

2. Apparatus as defined in claim 1 wherein said switching means comprises a pair of diodes, and wherein said primary winding of said additional impedance element has a centrally located tap therein, a first diode of said pair of diodes being coupled between the collector of said conducting transistor of said flipflop and a first end of said center tapped transformer, the second diode of said pair of diodes being coupled between the collector of said nonconducting transistor of said flipflop and a second end of said center tapped transformer;

said biasing means comprises a path of continuity from said centrally located tap of said transformer to each base electrode of said flipflop transistors, and said terminal means for receiving interrogation timing control signals being connected to said centrally located tap of said transformer.

References Cited

UNITED STATES PATENTS

| | | | |
|---|---|---|---|
| 2,883,525 | 4/1959 | Curtis | 328—196 |
| 2,898,479 | 8/1959 | McElroy | 307—282 |
| 2,977,485 | 3/1961 | Olsen | 307—282 X |
| 3,290,605 | 12/1966 | Humphrey | 328—206 X |
| 3,307,045 | 2/1967 | Jaivinen | 328—206 X |
| 3,334,292 | 8/1967 | King et al. | 307—262 X |

STANLEY T. KRAWCZEWICZ, Primary Examiner

U.S. Cl. X.R.

307—262, 269, 270, 282; 328—63, 65, 206